July 30, 1968  E. E. CROISANT ET AL  3,394,771
BRAKE VALVE FOR HYDRAULIC TRANSMISSION
Filed March 25, 1966  2 Sheets-Sheet 1
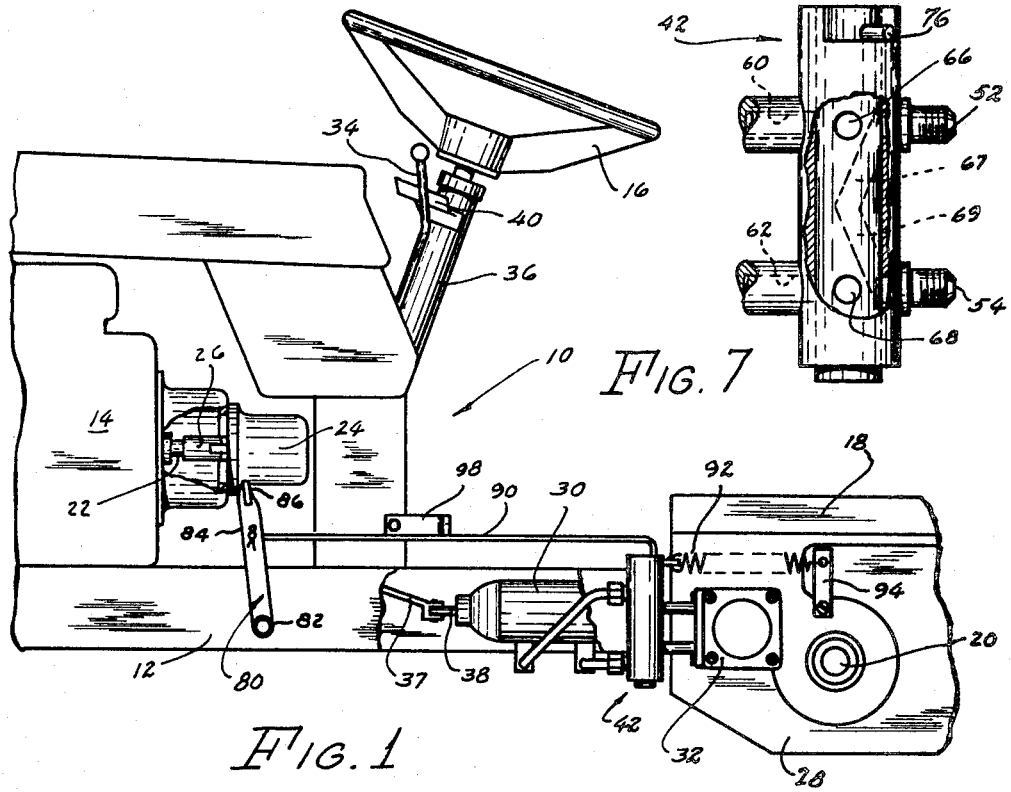
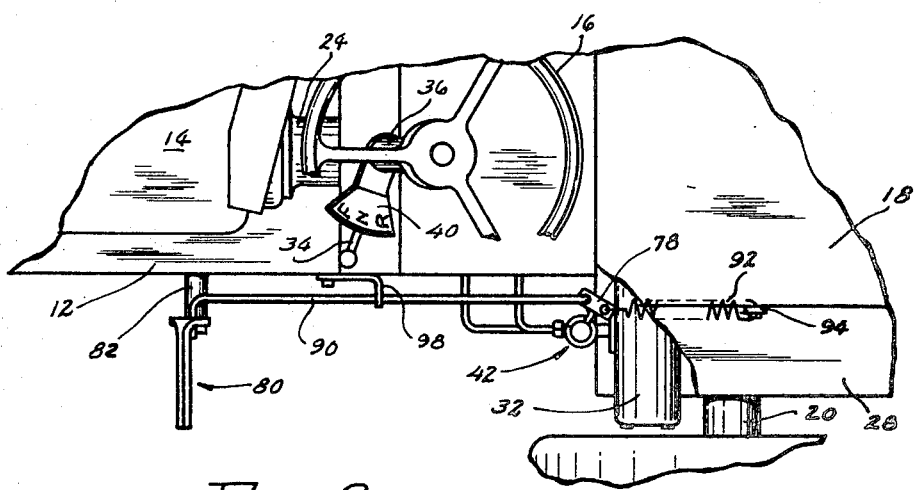
INVENTORS
ELMER E. CROISANT
ANDREW BLAAUW
BY  ATTY
    AGT July 30, 1968   E. E. CROISANT ET AL   3,394,771
BRAKE VALVE FOR HYDRAULIC TRANSMISSION
Filed March 25, 1966   2 Sheets-Sheet 2
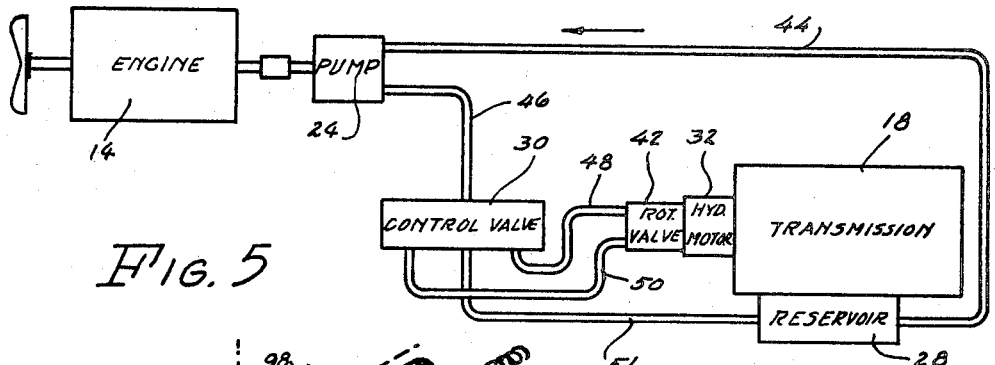
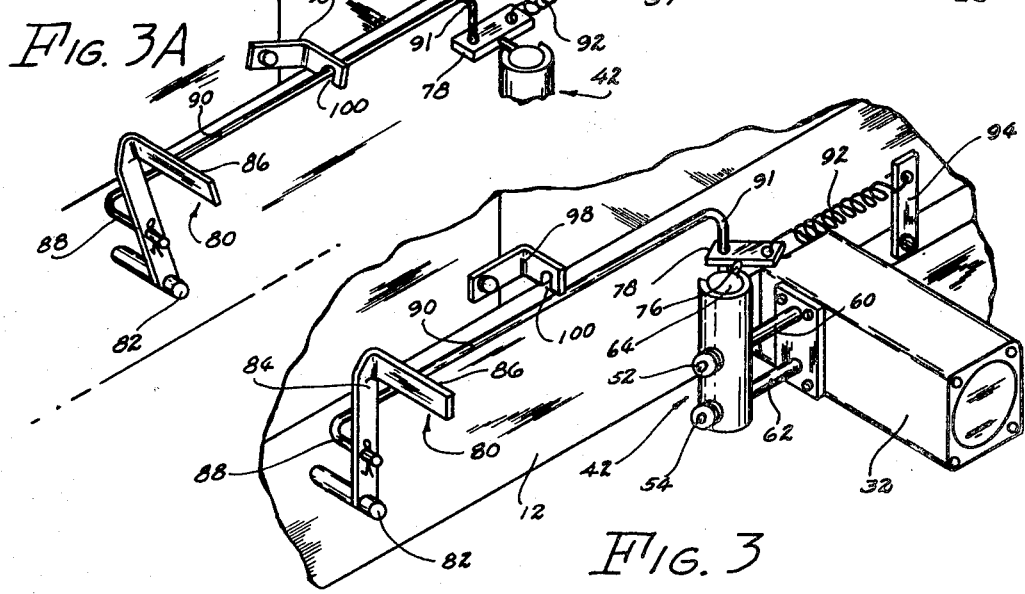
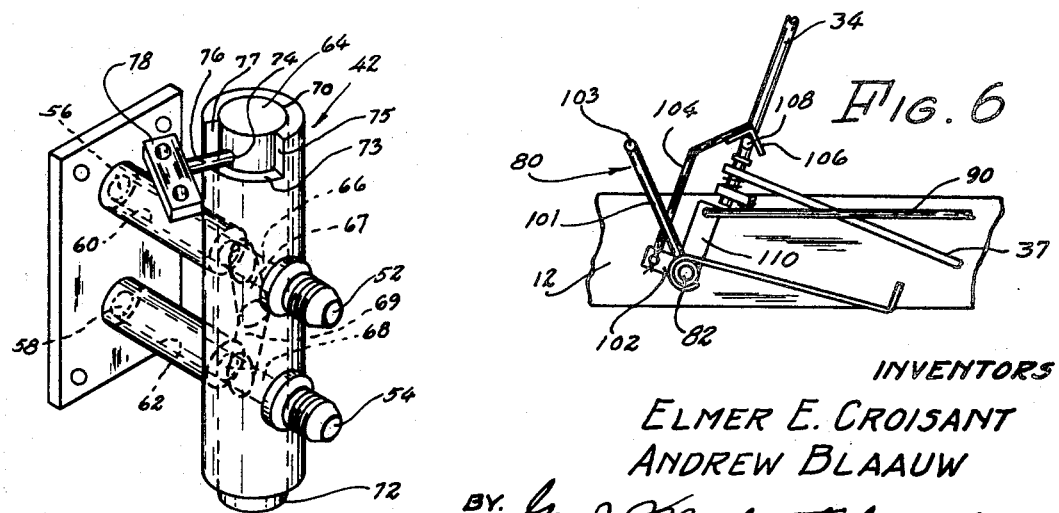
INVENTORS
ELMER E. CROISANT
ANDREW BLAAUW
BY *Geo J Muckenthaler* ATTY
*R. D. Godard* AGT United States Patent Office 3,394,771
Patented July 30, 1968

3,394,771
BRAKE VALVE FOR HYDRAULIC
TRANSMISSION
Elmer E. Croisant and Andrew Blaauw, Winneconne,
Wis., assignors to Colt Manufacturing Company, Inc.,
Winneconne, Wis., a corporation of Wisconsin
Filed Mar. 25, 1966, Ser. No. 537,444
5 Claims. (Cl. 180—66)

ABSTRACT OF THE DISCLOSURE

A braking mechanism for a hydraulically controlled vehicle including a rotary type valve connected in the hydraulic system, the valve having passageways positioned for fluid flow to the vehicle drive means, and bypass means for preventing fluid flow to the drive means. The rotatable element of the valve is spring loaded and is connected to an operator controlled pedal for positioning the valve from the full-flow to the no-flow condition. The mechanism also includes locking means for holding the valve in the no-flow position.

---

This invention relates to a braking means for a tractor and particularly to a hydraulic braking means for a tractor of the type which utilizes a hydraulically controlled or hydrostatic-type transmission.

Many of the smaller type or garden tractors today commonly use a power transmission, the control of which is done by means of a hydraulic pump driven by the engine, a master control valve and a hydraulic motor which drives the transmission and, in turn, the traction wheels. The control components include a manually operated lever which has three defined positions, full forward neutral, and full reverse, the master control valve being constructed such that movement of the control lever in the range between full forward and full reverse obtains an infinite number of tractor speeds by reason of the varying amount of fluid flow through the valve. The neutral position affords a control whereby the fluid flow is closed off to the hydraulic motor and, consequently, no power is transmitted to the transmission, so the vehicle would stop. An example of a drive and power transmission arrangement of this type is shown and described in U.S. Patent No. 3,192,792, granted to R. R Szaj and assigned to Colt Manufacturing Company, Inc. This method of speed control is known as a "slow stop," however, if the operator desires a faster stop from the forward direction of travel, he could move the lever from the forward to the reverse position and the fluid flow would momentarily be reversed to "fast-stop" the vehicle. This is not always good practice because of excessive forces exerted upon the control and drive system so it is desired to provide a better and improved method of braking and stopping the tractor.

The main object of this invention is to provide a simple and inexpensive braking means for a hydraulically controlled drive tractor.

Another object is to provide a vehicle braking means in the hydraulic control system.

A further object is to provide a braking means which utilizes a rotary valve in the fluid lines.

Another object is to provide a braking means whereby the actuation means is also used to lock the brake system in one position of the actuation means.

Additional objects and advantages will become apparent from a reading of the following description and the annexed drawings, in which:

FIGURE 1 is a side elevational view of a tractor embodying the present invention, certain parts of the tractor being omitted from the drawings;

FIG. 2 is a plan view of the same;

FIG. 3 is a perspective view of the braking means used in the hydraulic system;

FIG. 3A is a perspective view similar to FIG. 3 but showing the braking means in a different position;

FIG. 4 is an enlarged perspective view of the braking valve;

FIG. 5 is a diagrammatic view of the hydraulic system with the braking means in the fluid line;

FIG. 6 is a side view of a modification of the braking mechanism; and

FIG. 7 is a side elevational view of the braking valve showing the passageways.

As seen in FIG. 1, there is shown a tractor, generally designated as 10, the tractor including a frame 12, an engine 14, a steering wheel 16 and a transmission 18. The front and rear wheels are omitted from the drawing, it being understood that the engine delivers power to the transmission 18 which is connected to drive the rear or traction wheels carried on an axle 20. Engine 14 turns a crankshaft 22 which is connected to a hydraulic pump 24, through a coupling 26. This is a direct connection so that when engine 14 is running, pump 24 also runs and hydraulic fluid under pressure is being forced through the hydraulic system. The hydraulic system also includes a hydraulic supply or reservoir 28, the reservoir herein shown as being totally enclosed in the transmission case, a master control valve 30 and a hydraulic motor 32 which are positioned to be connected to the transmission to drive the traction wheels. Hydraulic lines or conduits are connected to the supply tank or reservoir 28, the pump 24, the control valve 30 and the hydraulic motor 32. A speed control means or handle 34 is supported from the steering wheel column 36 and by appropriate and suitable linkage 37, handle 34 when moved causes changes in displacement of a rod 38 in valve 30.

The handle 34 is constructed to be moved in an arc or quadrant 40 around portion of wheel 16, so that when handle 34 is moved to a full forward position, the linkage 37 is caused to be moved forward, rod 38 is displaced in valve 30, and as described in the above-mentioned patent, the hydraulic fluid is forced through the lines to hydraulic motor 32 and the tractor is set in motion. When handle 34 is moved to a full rearward direction on quadrant 40, the control valve is so set that the fluid enters the hydraulic motor and turns the motor in a reverse direction to drive the wheels in reverse. It is believed that the above-described patent adequately describes the general arrangement and operation of the hydraulic system, so that further description here is not believed necessary except as it relates to the present invention.

As stated above, the neutral position of the speed control lever affords the stop position for the hydraulic motor and the transmission and final drive of the tractor, as the control valve is then displaced so that no hydraulic fluid flows through the motor. This type of control for braking and for stopping the tractor may be all that is required in a number of instances, however, it is often desirable to have a surer braking means available for "fast-stops" and also to be able to brake the tractor while parking.

The present invention is a unique means for providing a brake and lock on a tractor which has a hydrostatic-type transmission. The invention includes a valve means 42 of the rotary type which is supported from and connected to the hydraulic motor 32. As seen in FIGS. 1 and 2, the motor is supported from the transmission case on the left side thereof and just forward of the rear axle. A fluid line or conduit 44, as seen in FIG. 5, is connected to the reservoir or supply tank 28, which line runs to and is connected to the hydraulic pump 24. A line or conduit 46 is connected to pump 24 and to control valve 30 and a pair of lines or conduits 48 and 50 are connected to control valve 30 and rotary valve 42. As shown in FIGS. 3 and 4, rotary valve 42 has inlet ports 52 and 54 and outlet ports 56 and 58 with communicating passageways 60 and 62. A return line 51 is connected to valve 30 and to the reservoir 28.

As thus far described, pump 24, when running with engine 14, pumps fluid from the reservoir 28 through line 44, to the control valve 30 through line 46, and through either line 48 or 50, depending upon whether the speed control handle 34 is in a forward or reverse position. The fluid flows through the rotary valve in either of the ports 52 or 54, either of the passageways 60 or 62 and either of the ports 56 or 58 into motor 32. Assuming the speed control handle 34 is moved to the forward position, the flow of fluid as seen in FIG. 5, is through line 44, line 46, line 48, through passageway 60, shown in FIG. 3, and into motor 32 to drive the transmission and the traction wheels in a forward direction. In reverse travel, the fluid flow is through line 44, line 46, line 50, through passageway 62 into motor 32, which reverses its direction and thus drives the transmission and wheels in the reverse direction. When the speed control handle 34 is in the neutral position, the flow is through conduit 44, conduit 46, and conduit 51 in a circulating manner, so the hydraulic motor 32 and the transmission 18 are at rest.

When it is desired to brake or fast-stop the tractor, the braking means of the invention is utilized, this means including the rotary valve and its associated actuating components,. The rotary valve 42 includes a member 64 which is rotatably and pivotally supported in the body of the valve. This member has a cylindrical shape which extends through the two ends of the valve body, and includes a first passageway 66 and a second passageway 68, shown in FIGS. 4 and 7, which, in one position of the member 64, is in communication with the inlet and outlet ports of the valve. Member 64 also has a bypass which includes a first angled passageway 67 and a second angled passageway 69, these passageways being connected as shown in FIGS. 4 and 7. Passageways 67 and 69 are disposed within member 64 at 90° from passageways 66 and 68 and also aligned with ports 52 and 54 such that as member 64 is rotated to one position passageways 66 and 68 communicate with ports 52 and 54 and in another position of member 64, passageways 67 and 69 communicate with ports 52 and 54. This relationship will be more fully described in the operation of the valve 42 as related to the braking operation. It is noted from FIGS. 1 and 4 that one end 72 of member 64 extends farther from valve 42 than the other end 70. End 70 has a bore 74 near the top surface and an arm or rod 76 is positioned in bore 74. Rod 76 has a flat portion 78 secured thereto such that these two parts take the shape of a key, the rod 76 having threads for inserting in bore 74. Arm 76 is positioned to ride on a surface 73 and as member 64 is rotated, arm 76 is limited in its travel by a pair of limiting surfaces 75 and 77 on the valve body. Flat portion 78 of arm 76 has a pair of bores transverse to the length thereof, the bores being positioned so that as the arm is disposed to one side of the body of the valve, the bores extend beyond the body as seen in FIGS. 3 and 4.

A manually operated means in the form of a foot pedal 80 is pivotally supported from the frame of the tractor on the left side thereof, by means of a pin 82. Pedal 80 is secured to pin 82 and has an upstanding arm 84 and an outstanding portion 86 which the operator depresses to actuate the braking means. Portion 86 may be a round member or a flat member twisted or bent as seen in FIG. 3. An arm 88 is secured to portion 84 of pedal 80 by means of a cotter pin, this arm being adjacent the frame 12, and connected to arm 88 is a link or rod 90 which runs along the frame and has an arm 91 which connects to a forward opening of portion 78 of rod 76. The connections of arms 88 and 91 with portions 84 and 78 are freely movable so that as pedal 80 is depressed forward, link 90 moves forward and pulls on arm 76 to rotate member 64 in valve 42. A spring 92 is connected at one end thereof in a rearward opening of portion 78, the other end of spring 92 being connected to a bracket 94 secured to the frame of the tractor. This linkage provides a spring loaded means for pedal 80 so that pressure on pedal 80 extends spring 92. The spring also helps maintain alignment of the passageways 66 and 68 in valve 42 with passageways 58 and 60. When pedal 80 is in the rear position, portion 78 of arm 76 is disposed to one side of the valve body 42 and extends in a sideward and rearward direction, as seen in FIGS. 2 and 3.

As stated above, member 64 has passageways 66 and 68 which are disposed between and connect the inlet ports 52 and 54 and passageways 60 and 62, as seen in FIG. 4. These passageways are disposed such that in a first position of member 64, the openings 66 and 68 are aligned with ports 52 and 54 and with passageways 60 and 62 and in a second position of member 64 the passageways are approximately 90° from the first position and therefore the fluid cannot flow through the valve and into motor 32. The first position of the passageways 66 and 68, and, consequently, the position of member 64 is the full flow position, and the second position of passageways 66 and 68 and member 64 is the blocked or no-flow position.

It is thus seen that when the speed control handle 34 is in a full forward position, the fluid flow is moving unrestricted from the pump 24 through line 46, to control valve 30, through valve 30 and line 48 and through port 52, passageways 66 and 60 and into motor 32. The fluid flow, in the full reverse position of handle 34, moves unrestricted from the pump 24 through line 46 to valve 30, through line 50, port 54, passageways 68 and 58 and into motor 32.

When it is desired to brake or "slow-stop" the tractor, the handle 34 is moved to the neutral position and the flow of fluid is from pump 24, through valve 30 and into the reservoir 28 to again be recirculated through the system. However, when it is desired to brake or "fast-stop" the tractor, the operator depresses pedal 80 which moves link 90 forward, which pulls rod 76 and rotates member 64 in a counterclockwise direction as viewed from the top of the valve 42, against the tension of spring 92, and passageways 66 and 68 and 90° out of phase with ports 52 and 54, as seen in FIG. 7, and the flow of fluid is blocked from hydraulic motor 32 and transmission 18.

As stated above, member 64 of valve 42 includes a bypass which is normal to the full-flow passageways and which bypass is provided for the circulation of the fluid when braking the tractor. Depressing pedal 80 rotated members 64 such that passageways 67 and 69 align with ports 52 and 54 and the hydraulic circuit is maintained in an open condition thus relieving any signficant back pressure. It is thus seen that the rotated valve closes the fluid circuit to and from the hydraulic motor 32 but also permits the fluid to circulate freely without building up heat as a result of high back pressures. This advantageous feature allows the valve to be actuated as a brake without first putting the system into either a hydraulic or a mechanical neutral.

The braking means also includes a locking means or latch 98 which is secured to the frame of the tractor. Latch 98 is positioned such that link 90 rides along one edge of the latch and the latch has a slot 100 disposed in one portion thereof. The position of the various parts, the pedal 80, the link 90 and the arm 76 is in a relation to tht latch 98 and the slot 100 such that when the brake is off, link 90 does not engage with latch slot 100, however, when the brake pedal 80 is depressed, the link 90 is moved over on latch 98 by reason of the relative position of these parts, rides along and edge thereof and then engages in slot 100. As seen in the plan view of FIG. 2, when pedal 80 is pushed to the left, the rear portion of link 90 moves toward frame 12 by reason of rotation of portion 78 and then is in the position to engage in slot 100. This is a park or full-brake position and the operator can then leave the tractor seat with the engine running and the fluid flow is blocked from the motor 32 so that the tractor cannot move. When the operator wishes to again move the tractor, he unhooks latch 98 from link 90 and the braking means member 64 is moved to the full-flow position by reason of the spring loaded pedal 80.

It is thus seen that herein shown and described is a braking means for a garden tractor having a hydrostatic or hydraulic fluid-type drive and control transmission, the braking means being a simple and dependable rotary valve in the hydraulic line and disposed such that when the braking means is actuated, the linkage is automatically engaged to lock the valve parts in a blocked position.

It is believed that the drawings and the above description fully disclose and explain the invention and that embodiments other than those described may occur to those skilled in the art.

Although the preferred embodiment includes basically the foot pedal 80, the rotary valve 42 in the hydraulic line, the connecting link 90, and the locking means 98, other variations include a means connected with the brake actuating pedal which automatically returns the speed control lever to the neutral position. For instance, a link secured to the pedal 80, which in this embodiment, includes an upstanding arm 101 and an outstanding portion 103, and connected to a sliding latch on speed control handle 34 near the lower end thereof would force the handle to the neutral position whenever portion 103 is depressed. As seen in FIG. 6, an arm 102 is connected to the pedal and a link 104 connected to arm 102, the link extending upwardly to an angular shaped latch 106 slidable on handle 34. When the pedal is to the rear, latch 106 is up and as the pedal is moved forward latch 106 will move downwardly and force handle 34 to the nuetral position. Latch 106 in so moving engages a pin 108 in lever 34 and rotates the lever so regardless of whether the handle is in the full forward or the full reverse position, the handle will be moved to the neutral position for more positive braking action. In this embodiment, and arm 110 is also connected to the pedal so that as the pedal portion 103 is moved forward, the link 90 being connected to arm 110 is pulled forward and rotates the brake valve to the blocked position. It is to be understood that all such variations are considered to be within the scope of this invention. The invention as described is not intended to be taken as limited by the embodiments disclosed nor in fact in any manner except as defined in the annexed claims.

What is claimed as new and desired to be secured by Letters Patent of the United States is:

1. In a braking means for use in a ground-driven tractor having a frame, an engine, a hydraulic pump operated by said engine, a hydraulic transmission unit, hydraulic connections extending from said pump to said transmission unit, a control valve hydraulically connected to said hydraulic connections for controlling fluid flow from said pump to said transmission unit, the improvement comprising a rotary valve supported on said frame and hydraulically connected intermediate said control valve and said transmission unit and having two fluid inlet ports in fluid flow communication with said control valve and having two fluid outlet ports in fluid flow communication with said transmission unit, a rotatable member included in said rotary valve and having two fluid passageways for the flow of fluid therethrough and to and from all said ports and said transmission unit in a first rotated position of said rotatable member, said rotatable member having a fluid bypass in fluid flow communication only with said inlet ports in a second rotated position of said rotatable member, rotation stop means operative on said rotatable member in both said first and said second rotated positions for stopping the rotation of said rotatable member at both and first and said second rotated positions, spring-biased connecting means connected to said rotatable member for rotating the latter and including a spring for rotating said rotatable member to said first rotated position, and said connecting means including an operator-actuated control for overcoming said spring and rotating said rotatable member to said second rotated position to thereby fluid-lock said transmission unit and bypass fluid through said rotary valve and between said inlet ports only.

2. The subject matter of claim 1, wherein said operator-actuated control includes a brake pedal, and said connecting means includes a rod interconnected between said brake pedal and said rotatable member, and a locking means releasably connected to said rod for releasably holding said rotatable member in said second rotated position.

3. A braking means in accordance with claim 2 wherein said locking means includes a latch on said frame, said latch defining a slot therein and being positioned in relation to said rod such that the latter is engaged in said slot when said rotatable member is in said second rotated position.

4. A braking means in accordance with claim 1, wherein said control valve has a neutral position of fluid flow therethrough with respect to said transmission unit, and including linkage means movable with said foot pedal and being operable on said control valve for setting the latter in said neutral position to stop the flow of hydraulic fluid to said rotary valve when said foot pedal is depressed.

5. A braking means in accordance with claim 4 wherein said linkage means includes a pin, and a connector on said foot pedal and engageable with said pin to move said control valve to said neutral position.

References Cited

UNITED STATES PATENTS

| | | | |
|---|---|---|---|
| 1,977,033 | 10/1934 | Adams | 180—66 XR |
| 1,999,288 | 4/1935 | Fjellstedt. | |
| 2,279,008 | 4/1942 | Nathan. | |
| 2,337,499 | 12/1943 | Roth. | |
| 2,421,013 | 5/1947 | Cornwell | 180—66 XR |
| 2,474,961 | 7/1949 | Sneed | 180—6.3 |
| 3,250,340 | 5/1966 | Roberson | 180—66 XR |

BENJAMIN HERSH, *Primary Examiner.*

MILTON L. SMITH, *Assistant Examiner.*